United States Patent Office 2,917,492
Patented Dec. 15, 1959

2,917,492

REACTION PRODUCTS OF 1-AZIRIDINYL COMPOUNDS WITH COMPOUNDS CONTAINING ACTIVE METHYLENE GROUPS

Wilson A. Reeves, Metairie, Leon H. Chance, New Orleans, and George L. Drake, Jr., Metairie, La., assignors to the United States of America as represented by the Secretary of Agriculture No Drawing. Application December 4, 1956
Serial No. 626,273

13 Claims. (Cl. 260—78.4)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new synthetic polymers, processes for their production and processes of employing these polymers. These new materials are especially suitable for use in the plastics and coating arts.

In general this invention relates to polymers capable of being produced by the reaction of compounds which contain two or more 1-aziridinyl groups

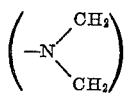

attached directly to non-metallic atoms with compounds which contain two or more active hydrogen atoms attached to carbon atoms.

It is an objective of the present invention to prepare a new class of synthetic materials, more particularly resinous compositions, which have particular utility in the plastics and coating arts, e.g. as laminating, impregnating, adhesive, coating, as textile and paper treating materials and as molding compositions. Other objectives of the invention will be apparent to those skilled in the art as the description of the invention proceeds.

We have discovered that compounds which contain two or more 1-aziridinyl groups attached directly to a non-metallic atom react with compounds that contain two or more active hydrogen atoms attached to carbon atoms (active hydrogen atoms are defined here as hydrogen atoms attached to carbon atoms which are alpha to an electronegative group such as

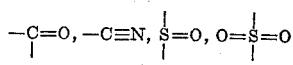

and

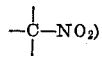

Such polymers contain the characteristic recurring connecting structures,

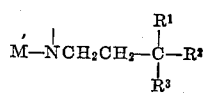

and

wherein M is a non-metal of the group P and S and wherein $R^1$ is a hydrogen atom, an alkyl or aryl group; $R^2$ is an electronegative group and $R^3$ is an electronegative group or an alkyl or aryl group.

Such polymers can be produced in the form of liquids or solid synthetic resins. They are flame resistant and when deposited in the interstices of hydrophilic fibrous organic materials, they reduce the flammability of such products. When deposited as surface coatings on non-hydrophilic materials, they form flame-resistant coatings.

1-aziridinyl compounds suitable for use in this invention are compounds that contain the following structures:

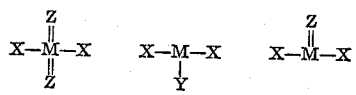

and

where Z is oxygen, sulfur or nitrogen; X is

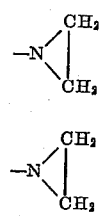

Y is a dialkyl amine, an alkyl, an alkylene or an aryl group; and M is phosphorus or sulfur. Some typical examples of compounds are:

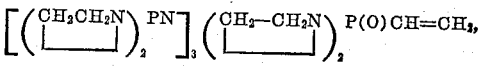

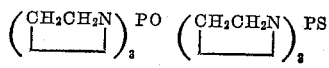

and

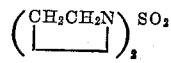

These 1-aziridinyl compounds can be prepared by substantially any of the known processes for producing such compounds. In general, they are prepared by reacting ethylenimine or substituted ethylenimines with the corresponding non-metallic halide in the presence of an acid acceptor such as trimethyl amine.

Compounds containing active methylene and methenyl groups for use in this invention include substantially any compound or polymer that contains two or more active hydrogen atoms attached to carbon atoms. Both aromatic and aliphatic compounds are useful. Some specific compounds that can be used in practicing the present invention are given below:

- Malononitrile
- Ethylmalonate
- Cyclopentadiene
- Trimethylenetrisulfone
- Trimethylenethiodisulfone
- Nitromethane The invention is not limited to the use of these compounds.

The proportions of reactants can be varied widely depending, for example, upon the particular properties desired in the final product. The amount of compound containing the active hydrogen used in this process may be only about 2% of the amount of aziridinyl compound used or it may be a much greater proportion. These compounds enter the reaction with aziridinyl compounds readily when used in quantities not to exceed about one active hydrogen per aziridinyl group.

The reaction can be carried out with or without a solvent. If either the compound containing the active hydrogen or aziridinyl compound is a liquid at about room temperature, the solid component may be dissolved in the liquid component. In many cases it is preferable to carry out the reaction in a solvent. Suitable solvents include water and most common organic solvents that dissolve the reactants. Water, benzene, and dimethylformamide have been found to be especially good solvents.

The temperature of the reaction can be varied depending, for example, upon the particular reactants employed, the rapidity of reaction wanted, the particular properties desired in the reaction product, and other factors. For example, trimethylenetrisulfone reacts with tris(1-aziridinyl)phosphine sulfide rapidly at 20° C. whereas ethylmalonate reacts slowly with the same aziridinyl compound at 80° C. In general, the polymers described in this invention are prepared at a temperature ranging from about 10° C. up to about 150° C.

The following examples are given by way of illustration and not by way of limitation of this invention. All parts and percentages are by weight. For convenience the compound, tris(1-aziridinyl)phosphine sulfide and tris(1-aziridinyl)phosphine oxide are referred to as APS and APO respectively.

Example 1

REACTION OF MALONONITRILE WITH APS

A clear solution was prepared by dissolving 80 parts of APS in 40 parts of malononitrile at 40° C. Then this solution was polymerized as follows:

A. *Without catalyst.*—10 parts of the solution was placed in a large watch glass and heated at 85° C. for 1.5 hours to produce a brown, insoluble polymer. The polymer was highly flame resistant.

B. *In the presence of sodium hydroxide.*—1 part of 20% sodium hydroxide was added to 10 parts of the clear solution, then it was heated at 80° C. Within 1½ hours a dark brown, hard and brittle resin had formed.

C. *In the presence of acetic acid.*—1 part of glacial acetic acid was added to 10 parts of the clear solution, then one half of it was heated at 80° C. and the other half was left at room temperature. The heated portion polymerized at a rate greater than that in either A or B above. A light brown, clear resin was formed within 1 hour. The polymer was insoluble in water, ethanol, benzene and in acetone. It was highly flame resistant.

The portion left at room temperature (27° C.) polymerized to a hard brittle resin in 2 days. It contained 10.86% phosphorus.

Example 2

REACTION OF TRIMETHYLENETHIODISULFONE WITH APS

Five parts of trimethylenethiodisulfone

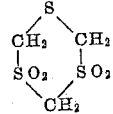

was dissolved in approximately 10 parts of 1.0 Normal sodium hydroxide solution, then 5 parts of APS was dissolved in the solution. The resulting solution was heated at about 100° C. Within 3 to 4 minutes a pale yellow resin began to form at the bottom of the solution. After 10 minutes of heating the resinous product was removed. It was soft and insoluble in water and in dilute alkali solution. The soft polymer was converted to a hard brittle resin by heating it in a hot air oven for 30 minutes at 105° C.

Example 3

REACTION OF TRIMETHYLENETHIODISULFONE WITH APS AND APO

One and one half parts of trimethylenethiodisulfone

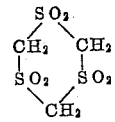

was dissolved in 20 parts of 0.05 Normal sodium hydroxide. Then 4 parts of APS was dissolved in it to produce a clear solution. After standing in a beaker at 25° C. for about 20 minutes a mealy-white insoluble polymer began to form. After polymerization had proceeded for 2 hours, it was separated. The sample was heat resistant but would yellow when heated at 200° C. for a few minutes. The polymer was highly flame resistant.

A very similar polymer was prepared when APO was substituted for the APS and the reaction conditions were the same as described above in this example.

Example 4

REACTION OF TRIMETHYLENETRISULFONE WITH APS

Two parts of trimethylenetrisulfone

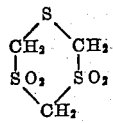

was dissolved in 10 parts of .05 Normal sodium hydroxide solution. Then 2 parts of APS was dissolved in the solution to form a clear solution. One portion of this solution was used to pad 8 oz. cotton fabric and the remaining solution was allowed to set at about 25° C. The padded fabric was heated 5 minutes at 145° C. then rinsed and air dried. The fabric had a good hand and was flame resistant.

The clear solution that was allowed to set began to deposit polymer in about 20 minutes. When portions of this solution were placed upon a watch glass and heated 10 minutes at 110° C. a white insoluble polymer formed. The polymer was highly flame resistant.

We claim:

1. A process for producing flame-resistant polymers which comprises mixing an aziridinyl compound selected from the group consisting of a 1-aziridinyl phosphine oxide containing at least two 1-aziridinyl groups and 1-aziridinyl phosphine sulfide containing at least two 1-aziridinyl groups with an active methylene group containing compound selected from the group consisting of malononitrile, trimethylenethiodisulfone, and trimethylenetrisulfone and permitting said aziridinyl compound and said active methylene group containing compound to react with each other until a flame-resistant polymeric reaction product is formed, the amount of said active methylene group containing compound varying from about 2% by weight of said aziridinyl compound to an amount sufficient to provide about one active hydrogen per aziridinyl group.

2. A process for producing a flame-resistant polymer which comprises mixing tris(1-aziridinyl) phosphine sulfide with malononitrile and permitting the sulfide and malononitrile to react with each other until a polymeric reaction product is formed, the amount of malononitrile varying from about 2% by weight of the sulfide to an amount sufficient to provide about one active hydrogen per aziridinyl group.

3. A process for producing a flame-resistant polymer which comprises mixing tris-(1-aziridinyl) phosphine sulfide with trimethylenethiodisulfone and permitting the sulfide and trimethylene-thiodisulfone to react with each other until a polymeric reaction product is formed, the amount of trimethylenethiodisulfone varying from about 2% by weight of the sulfide to an amount sufficient to provide about one active hydrogen per aziridinyl group.

4. A process for producing a flame-resistant polymer which comprises mixing tris(1-aziridinyl) phosphine oxide with trimethylenethiodisulfone and permitting the oxide and trimethylenethiodisulfone to react with each other until a polymeric reaction product is formed, the amount of trimethylenethiodisulfone varying from about 2% by weight of the oxide to an amount sufficient to provide about one active hydrogen per aziridinyl group.

5. A process for producing a flame-resistant polymer which comprises mixing tris-(1-aziridinyl) phosphine sulfide with trimethylenetrisulfone and permitting the sulfide and trimethylenetrisulfone to react with each other until a polymeric reaction product is formed, the amount of trimethylenetrisulfone varying from about 2% by weight of the sulfide to an amount sufficient to provide about one active hydrogen per aziridinyl group.

6. A flame-resistant polymer obtained by mixing an aziridinyl compound selected from the group consisting of a 1-aziridinyl phosphine oxide containing at least two 1-aziridinyl groups and a 1-aziridinyl phosphine sulfide containing at least two 1-aziridinyl groups with an active methylene group containing compound selected from the group consisting of malononitrile, trimethylenethiodisulfone, and trimethylenetrisulfone and permitting said aziridinyl compound and said active methylene group containing compound to react with each other until a flame-resistant polymeric reaction product is formed, the amount of said active methylene group containing compound varying from about 2% by weight of said aziridinyl compound to an amount sufficient to provide about one active hydrogen per aziridinyl group.

7. A flame-resistant polymer obtained by the process of claim 2.

8. A flame-resistant polymer obtained by the process of claim 3.

9. A flame-resistant polymer obtained by the process of claim 4.

10. A flame-resistant polymer obtained by the process of claim 5.

11. A homogeneous liquid flame-proofing composition comprising the incompletely reacted product obtained by mixing an aziridinyl compound selected from the group consisting of a 1-aziridinyl phosphine oxide containing at least two 1-aziridinyl groups and a 1-aziridinyl phosphine sulfide containing at least two 1-aziridinyl groups with an active methylene group containing compound selected from the group consisting of malononitrile, trimethylenethiodisulfone, and trimethylenetrisulfone, permitting said aziridinyl compound and said active methylene group containing compound to react with each other and stopping the reaction while the reaction mixture is still a homogeneous liquid and before the polymerization reaction has progressed to the point where the reaction product has become a solid insoluble polymer, the amount of said active methylene group containing compound varying from about 2% by weight of said aziridinyl compound to an amount sufficient to provide about one active hydrogen per aziridinyl group.

12. A process for flame-proofing a cellulosic fabric which comprises impregnating a cellulosic fabric with the incompletely reacted homogeneous liquid product of claim 11, and heating the impregnated fabric to complete the polymerization reaction and produce in said fabric a solid, insoluble, flame-retardant polymer.

13. The flame-resistant cellulosic fabric obtained by the process of claim 12.

References Cited in the file of this patent

UNITED STATES PATENTS

| | | |
|---|---|---|
| 2,606,901 | Parker | Aug. 12, 1952 |
| 2,654,738 | Lecher | Oct. 6, 1953 |
| 2,672,459 | Kuh | Mar. 16, 1954 |
| 2,682,521 | Coover | June 24, 1954 |

FOREIGN PATENTS

| | | |
|---|---|---|
| 854,651 | Germany | Nov. 6, 1952 |
| 863,055 | Germany | Jan. 15, 1953 |
| 888,853 | Germany | Sept. 7, 1953 |